US009920854B2

(12) United States Patent
Seel et al.

(10) Patent No.: US 9,920,854 B2
(45) Date of Patent: Mar. 20, 2018

(54) CONTROL VALVE HAVING A TRANSMISSION UNIT

(71) Applicant: REGELTECHNIK KORNWESTHEIM GMBH, Kornwestheim (DE)

(72) Inventors: Alexander Seel, Obersulm (DE); Horst Toberer, Oberderdingen (DE); Boris Wassmer, Korntal-Munchingen (DE)

(73) Assignee: Circor Aerospace, Inc., Hauppauge, NY (US)

( * ) Notice: Subject to any disclaimer, the term of this patent is extended or adjusted under 35 U.S.C. 154(b) by 0 days.

(21) Appl. No.: 15/501,394

(22) PCT Filed: Sep. 24, 2015

(86) PCT No.: PCT/EP2015/072014
§ 371 (c)(1),
(2) Date: Feb. 2, 2017

(87) PCT Pub. No.: WO2016/050609
PCT Pub. Date: Apr. 7, 2016

(65) Prior Publication Data
US 2017/0234453 A1    Aug. 17, 2017

(30) Foreign Application Priority Data
Sep. 29, 2014    (DE) .................... 20 2014 104 637 U

(51) Int. Cl.
F16K 1/38        (2006.01)
F16K 31/50       (2006.01)
F16K 37/00       (2006.01)

(52) U.S. Cl.
CPC .............. *F16K 31/508* (2013.01); *F16K 1/38* (2013.01); *F16K 37/0041* (2013.01); *Y10T 137/8242* (2015.04)

(58) Field of Classification Search
CPC ...... F16K 31/508; F16K 1/38; F16K 37/0041; Y10T 137/8225; Y10T 137/8242
(Continued)

(56) References Cited

U.S. PATENT DOCUMENTS

| 951,927 A | * | 3/1910 | Whitney | F16K 37/0008 116/277 |
| 1,341,319 A | * | 5/1920 | Hodges | F16K 31/143 137/553 |

(Continued)

FOREIGN PATENT DOCUMENTS

| DE | 1550145 B1 | 11/1969 |
| DE | 447309 A1 | 7/1996 |

(Continued)

*Primary Examiner* — John Bastianelli
(74) *Attorney, Agent, or Firm* — McNees Wallace & Nurick LLC

(57) ABSTRACT

A control valve (1) with a valve housing (13) through which a flow channel (14) runs with a flow cross section changeable by a closure unit consisting of a valve seat and a valve cone which is adjustable relative to the valve seat. An adjusting device has a sliding unit (2) with a sliding rod (21) adjusting the valve cone over an adjustment path and a drive device acting on the sliding rod and controlled by a controller. The controller has a measuring unit (4) which detects the adjustment path via a transmission unit. The transmission unit is provided with an adapter unit (3) comprising a replaceable structural unit, between the sliding unit (2) and the measuring unit (4), said adapter unit converting the adjustment stroke into a measurement stroke specified by the measuring unit (4) in a manner corresponding to a transmission ratio specified by the adapter unit.

17 Claims, 6 Drawing Sheets

(58) Field of Classification Search
USPC .................. 251/129.04, 318; 137/553–554
See application file for complete search history.

(56) References Cited

U.S. PATENT DOCUMENTS

| | | | | |
|---|---|---|---|---|
| 3,332,438 | A | * | 7/1967 | Abdullaev .............. E21B 34/02 |
| | | | | 137/554 |
| 3,647,038 | A | | 3/1972 | Balz |
| 4,771,807 | A | * | 9/1988 | Karani ................... F16K 31/05 |
| | | | | 137/553 |
| 6,471,182 | B1 | | 10/2002 | McIntosh |
| 2011/0233441 | A1 | * | 9/2011 | Miners ................. F16K 3/0281 |
| | | | | 251/324 |
| 2013/0314239 | A1 | | 11/2013 | Clark et al. |
| 2014/0245625 | A1 | * | 9/2014 | Mikesell ............. F16H 25/2015 |
| | | | | 33/706 |

FOREIGN PATENT DOCUMENTS

| | | | |
|---|---|---|---|
| DE | 19850188 | A1 | 5/1999 |
| DE | 29923552 | U1 | 1/2001 |
| DE | 102006020184 | A1 | 11/2004 |
| FR | 921712 | A | 5/1947 |
| JP | H04165172 | A | 6/1992 |
| WO | 2010068965 | A1 | 6/2010 |

* cited by examiner

CONTROL VALVE HAVING A TRANSMISSION UNIT

FIELD OF THE INVENTION

The invention relates to a control valve with a valve housing through which a flow channel runs with a flow cross section that can be changed via a specified adjustment stroke by means of a closure unit consisting of a valve seat and a valve cone which can be adjusted relative to the valve seat, and with an adjusting device which has a sliding unit with a sliding rod that adjusts the valve cone over an adjustment path and a drive device that acts on the sliding rod and is controlled by a controller, wherein the controller has a measuring unit which detects the adjustment path via a transmission unit.

BACKGROUND OF THE INVENTION

Such control valves are used for controlling fluid flows, for example, in the process of foodstuff industry, for example, also as a steam valve. In this context, the flow cross section which can be changed via the valve cone enables a precise control of the corresponding mass and volume flow. In order to ensure the precise control, known control valves of the type mentioned at the beginning comprise transmission units for transferring the adjustment path that has been traveled to a control unit.

Thus, in DE 44 47 309 C2, a control valve is indicated, which comprises a transmission unit with a signal generator for transferring the path of the sliding rod or of the valve cone that has been traveled to a controller. The signal generator is coupled via a cantilever arm to the sliding rod, so that its adjustment stroke is transferred via a corresponding signal to the controller.

DE 198 50 188 A1 relates to an adapter by means of which a valve and an actuation device are coupled to one another for this purpose, for the purpose of limiting the heat transfer between the valve and the actuation device.

In DE 299 23 552 U1, a 3-way valve is indicated, in which, when the spindle is moved, two throttling devices moved via a valve spindle produce opening degrees in opposite directions. In DE 10 2006 020 184 A1, another control valve is disclosed. Here, two flow control devices that are adjustable by a common actuation mechanism are present as well as a controller acting on them and an additional control device.

Control valves with different adjustment stroke, as used for different purposes of use, are also provided with different measuring units and accommodations for same, wherein considerable expense is associated with the manufacture of the different parts and the installation which requires high precision.

There is a need in the art for a control valve which requires little expense for parts and production of valves for different purposes of use.

BRIEF DESCRIPTION OF THE INVENTION

In one embodiment, it is provided that the transmission unit, between the sliding unit and the measuring unit, is provided with an adapter unit comprising an exchangeable structural unit between the sliding unit and measuring unit, which converts the adjustment stroke in accordance with the transmission ratio predetermined by it into a measurement stroke predetermined by the measuring unit. Thus, advantageously, a standard measuring unit can be used for control valves with different adjustment strokes. This enables, for example at the same time the use of a standard valve cover for covering the measuring unit. In the case of valves with different adjustment strokes, only the exchangeable structural unit needs to be adapted, so that considerably fewer different components are used than in different conventional control valves. If appropriate, additional components used for stabilization can be replaced, such as, for example, the subshell of the housing surrounding the measuring unit, which can be advantageous, for example, in the case of valves with large adjustment strokes.

In an advantageous embodiment variant, it is provided that the measuring unit comprises a displaceably mounted lifting element, and that the structural unit comprises a transmission unit which is coupled to the lifting element. In this manner, a simple coupling of the adapter unit comprising the exchangeable structural unit to the measuring unit can be achieved.

In this context, the coupling can be optimized in that the structural unit comprises a lifting member by means of which the transmission unit is coupled to the lifting element.

A variant that is particularly simple to design and install and that is durable consists in that the transmission unit is an axially non-displaceable rotatably mounted adapter shaft which is coupled to the lifting element via a lifting member which is axially moved on said adapter shaft during the turning, and that the lifting member is a lifting nut. The thread of the lifting nut here is adapted to the thread of the adapter shaft.

A secure coupling is achieved in that the lifting member is fixed with friction lock to the lifting element. For this purpose, fastening means, in particular screws, can be used, so that the friction-lock connection can be loosened again and the exchangeability of the lifting member is ensured. A positive-lock coupling enabling the transmission of an adjustment force from the lifting member to the lifting element is also possible.

Advantageously, the lifting element is designed as a displaceably mounted measuring carriage. Said carriage can be mounted simply and securely, for example, on frames, braces or the like, or on walls of the housing in the inner space thereof, is a manner that enables displacement with precise guidance, for the purpose of which, for example, parallel rails, grooves, rods or similar guides can be used.

For structure and function, it is advantageous if the adapter unit comprises a coupling element for the coupling to the sliding unit, and a bearing unit for the connection to the housing of the control valve, and if the sliding unit is provided with a coupling connection complementary to the coupling element.

In this context, it can be provided according to the invention that the coupling element is part of the exchangeable structural unit and that the bearing unit with the structural unit is connected exchangeably or permanently to the valve housing. The exchangeable elements (coupling element and/or bearing unit) can be replaced simply, if necessary, for example, when a valve is to be retrofitted. However, the adapter unit can also be designed so that the coupling element and/or the bearing unit can be used as a unit and is therefore not part of the exchangeable structural unit.

A good functionality of the control valve according to the invention is achieved in that the lifting element travels a measurement path that is proportional to the adjustment path in a manner corresponding to the transmission ratio, in that the lifting element transfers the measurement path by means of at least one transmission bar arranged on the lifting element to the transmission unit which is in an operative connection with a signal generator delivering position signals, and in that the measuring unit is designed for determining the adjustment stroke from position signals of the signal generator. The transmission unit is here designed, for example, as a gear wheel which converts the axial movement of the transmission bar in a simple manner into a rotation movement in accordance with the measurement stroke. This is particularly advantageous if, as signal generator, a rotary potentiometer is provided, since, in that case, the rotation movement can be transferred simply, for example, by a common rotation axle to the signal generator. Via the signal generator, the mechanically transferred information on the amount of distance that has been traveled is converted into an electrical signal, the position signal. From this signal the adjustment path can be determined, for example, via a signal processing unit which has the information of the transmission ratio, among others, available.

According to the invention, it is advantageous if the adjustment stroke is between 1 and 100 mm and the measurement stroke between 1 and 80 mm, wherein the measurement stroke is smaller than or equal to the adjustment stroke. The adjustment path or the measurement here represents, for example, a certain portion on the adjustment or measurement stroke, which describes the distance between 0 and 100% of the path, that is to say the respective maximum possible adjustable path. The adjustment stroke can be predetermined by a control stroke stored in the controller and it does not have to correspond to a maximum stroke determined by the mechanical construction.

Since the transmission unit with its end facing the valve seat protrudes into the bearing unit connected fixed in place to the housing and is fixed in the bearing unit in a manner so that it cannot be move in the measurement stroke direction, a precise transfer of the adjustment path that has been traveled is achieved. Thus, for example, an axial movement of the spindle nut which is not part of the adjustment path is not transferred to the transmission unit. Such a movement of the spindle nut can be generated, for example, when the valve cone comes in contact with the valve seat (complete closure of the valve) and when the impact is cushioned by means of a spring system. A distorting in the transmission over the measurement path is prevented. A merely axial movement of the spindle nut in the case of spring system is not transferred, since the coupling between the spindle nut and the transmission unit allows a relative axial movement between the two.

When the transmission unit in the bearing unit is rotatably mounted about the measurement stroke axis, this enables a simple transfer of the adjustment path to the measuring device. It is particularly advantageous to provide a ball bearing here since it is smooth-running, but other bearings that enable a rotation movement are also possible.

An advantageous design of the sliding unit is achieved in that the sliding unit comprises a spindle nut which extends longitudinally concentrically with respect to the adjustment stroke axis and which can be set in rotation about the adjustment stroke axis depending on the drive direction, and in that the sliding rod is a threaded rod guided in the spindle nut, wherein it is mounted in such a manner that it is adjusted in the adjustment stroke direction during the rotation of the spindle nut.

When the spindle nut with its end facing away from the valve seat protrudes on the opposite side of the transmission unit into the bearing unit, when the coupling element is arranged between the spindle nut and the transmission unit in the bearing unit, and when the coupling is designed in such a manner that the rotation of the spindle nut is transferred via the coupling element to the transmission unit, a simple transfer of the movement of the sliding unit to the transmission unit can be achieved.

Advantageously, it is provided according to the invention that the rotation of the transmission unit adjusts the lifting element in the measurement stroke direction by means of the lifting member fixed with friction lock to the lifting element.

Since the spindle nut on the side thereof facing the valve seat is resiliently braced by a spring mount relative to the valve seat and/or since the spindle nut is resiliently braced in the bearing unit, hard impacts that occur when reaching the initial and/or end position are absorbed. In this manner, damage of this type to the control valve is prevented. Here, a spring system ensures a secure closing when the valve cone is placed on the valve seat.

In this context, it is provided advantageously that, in the fully retracted state of the sliding rod, the spindle nut can be moved into the spring path of the spindle nut or in the bearing unit. In addition, it can be provided advantageously that, in the completely retracted state of the sliding rod, the spindle nut can be moved into the spring path in the bearing unit.

An advantageous design here consists in that the spring mount comprises disc springs for the resilient bracing of the spindle nut.

BRIEF DESCRIPTION OF THE DRAWINGS

The presently disclosed subject matter will be better understood from reading the following description of non-limiting embodiments, with reference to the attached drawings, wherein below:

Wherever possible, the same reference numbers will be used throughout the drawings to represent the same parts.

FIG. 1 shows a control valve 1 with a valve housing 13 which comprises a flow channel 14. The valve housing 13 supports, in its interior, a valve seat with which a valve cone can be brought in contact by means of a sliding unit 2 in order to close the flow channel 14. On the upper side, the valve housing 13 has a connection flange, on which an attachment part with its flange plate is placed and fastened by means of fastening screws. The attachment part supports a bridge 15 which is provided with two perforations. Into the perforations, longitudinal guides 12 oriented parallel to one another, extending vertically upward, are inserted. On the side of the longitudinal guides 12 facing away from the attachment part, a housing 10 with a subshell 10.2 and a cover 10.1 is arranged, accommodating a measuring unit 4, among others (see FIG. 2). Under the housing 10, between the two longitudinal guides 12, an adjusting device 11 is located, which extends in the direction of the valve housing 13. As part of the adjusting device 11, on the lower side of the subshell 10.2, parts of a drive device 11.1 can be seen. Furthermore, the adjusting device 11 comprises the sliding unit 2 with a sliding rod 21, which can be seen under the drive device 11.1. The sliding rod 21 is arranged between a spindle nut 23 of the sliding unit 2 (see FIG. 2) and the valve housing 13, extending coaxially with respect to the spindle nut 23. Between the sliding rod 21 and the spindle nut 23, a spring mount 22 is located (see FIG. 2).

FIG. 2 shows several components of the control valve 1 according to FIG. 1 in an exploded view. The represented components comprise the measuring unit 4, which is located, in the complete control valve 1, within the housing 10, an adapter unit 3 arranged under the measuring unit 4, and the sliding unit 2 represented again under the adapter unit 3.

Figure 1:
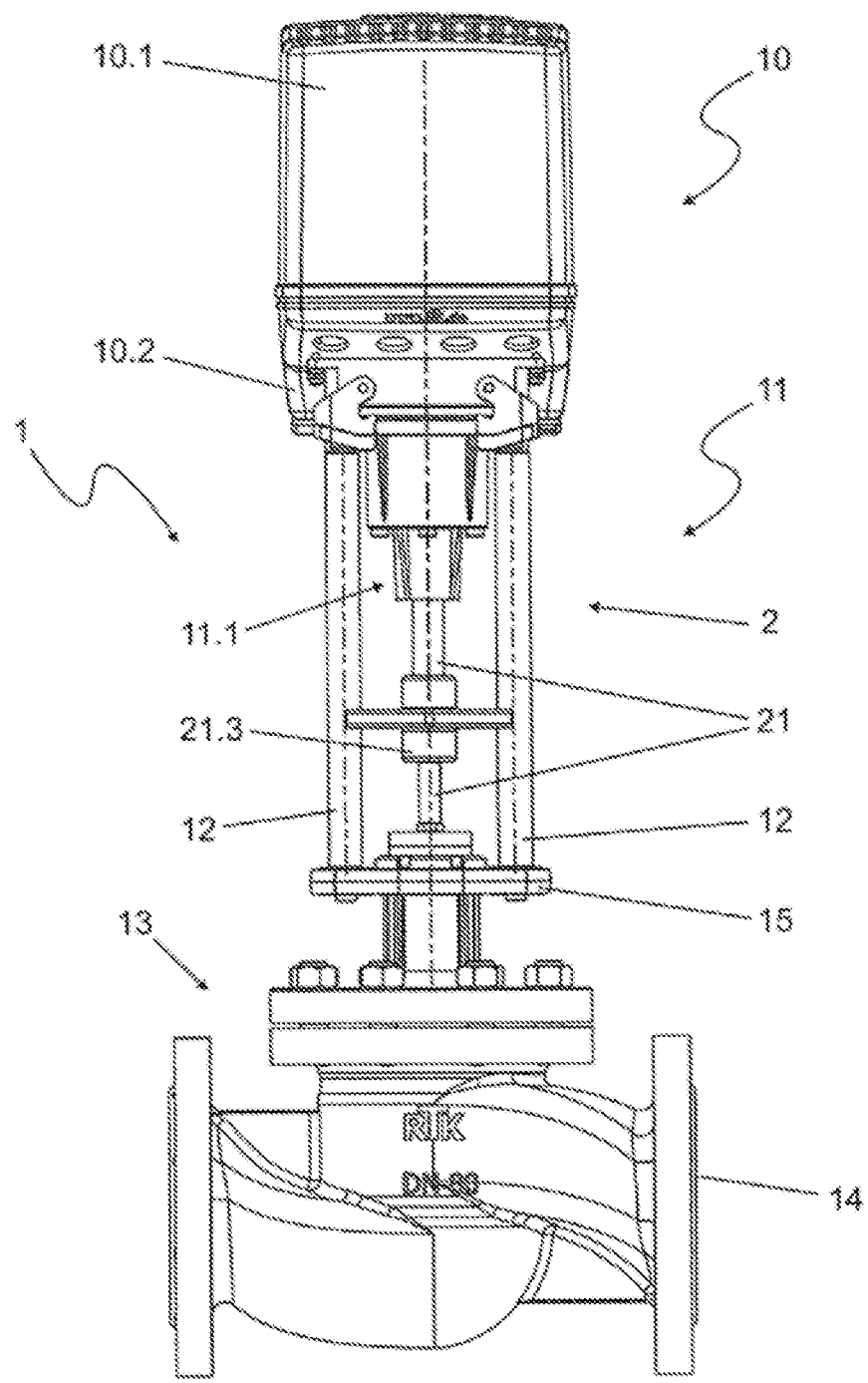
FIG. 1 shows a control valve according to the invention with valve housing and housing with accommodated measuring device.

On its side oriented in the direction of the valve housing 13 (not represented in FIG. 2), the sliding unit 2 comprises the sliding rod 21. The sliding rod 21 is designed at least in part as a threaded rod and, at the end thereof oriented in the direction of the valve housing 13, it narrows for the connection to the valve cone (not represented). With the upper end on the opposite side from the narrowing, the sliding rod 21 protrudes through the spring mount 22 with the outer thread thereof into an inner thread of the spindle nut 23 which is rotatably connected to the spring mount 22 via two ball bearings 22.2. It would be possible to use another radial bearing instead of the ball bearing 22.2. The spring mount 22 comprises a disc spring assembly 22.1 between the ball bearings 22.2, in order to cushion the spindle nut 23 when the sliding rod 21 moves against an abutment, in particular with the valve cone into the valve seat.

Instead of the disc spring assembly 22.1, another spring device, for example a coil spring, can also be used. However, the disc spring assembly has the advantage that it can absorb large forces in a compact space.

The spindle nut 23 facing away from the spring mount 22 in the direction of the measuring unit 4 can be set in rotation via a drive end and a transmission (drive and transmission are not represented). It has different outer diameters. Via a ledge 23.1, the spindle nut transitions into an insert section 23.2 which is arranged on its upper end facing the adapter unit 3 and which has a smaller outer diameter in comparison to the section arranged under the ledge 23.1. By means of the insert section 23.2, the spindle nut 23 is coupled to the adapter unit 3. For this purpose, the spindle nut 23, on its upper end, on the front side, comprises two recesses 23.3.

According to the invention, an adapter unit 3 is arranged above the sliding unit 2. Said adapter unit is used as transmission unit in order to transfer the adjustment path of the sliding rod 21, and thus of the valve cone, to the measuring unit 3. In the embodiment example shown, the entire transmission unit is associated with the adapter unit 3. However, in another design, elements of the transmission unit that are not associated with the adapter unit 3 can also be present.

The adapter unit 3 comprises a coupling element 31 designed as a thickened disk which is arranged between the spindle nut 23 and an adapter shaft 33 of the adapter unit 3, and which transfers the rotation movement of the spindle nut 23 to the adapter shaft 33. For this purpose, the coupling element 31, on the outer periphery thereof, has two projections 31.1 and, in the center, a four-sided perforation 31.2. The projections 31.1 are designed so that they engage with positive-lock and friction-lock connection in the recesses 23.3 of the spindle nut 23. Into the perforation 31.2, the lower end of the adapter shaft 33 protrudes with a coupling end 33.1 of four-sided design (visible in FIG. 6(a)) with positive-lock connection. Other polygonal designs of the perforation 31.2 and of the coupling end 33.1 which correspond to one another are also possible. A rotationally fixed coupling between the spindle nut 23 and the adapter shaft 33 via the coupling element 31 is implemented in a bearing unit 32 of the adapter unit 3. The bearing unit 32 can be secured in a non-displaceable manner via two downward directed braces 32.2 and fastening sites arranged thereon via fastening means, in this case Allen screws 32.1, to the housing 10 of the control valve 1. Due to its design, the bearing unit 32 can be produced simply by means of a molding tool. The adapter shaft 33 is moved into the bearing unit 32 from above through a recess 32.3 and fixed vertically, but rotatably mounted, in the bearing unit 32. The vertical fixing enables a precise transmission of the adjustment path via the measurement path to the measuring unit 4. Furthermore, the adapter unit 3 comprises a lifting nut 34 (not represented in FIG. 2, see FIG. 5) which fits the thread of the adapter shaft 33 and which is attached to a measuring carriage 41 of the measuring unit 4 with positive-lock and/or friction-lock connection, for the purpose of transferring the measurement stroke to the measuring unit 4. The coupling represented between adapter unit 3 and sliding unit 2 contributes to a simple assembly and disassembly.

The measuring carriage 41 extends over the width of a fastening housing 46 of the measuring unit 4. It is vertically displaceably mounted on the side walls 46.1 thereof on guides 46.2 that are beveled outward. Transmission bars 42 that enclose the guides 46.2 are attached on the two sides on the lateral margins of the measuring carriage 41. The transmission bars 42 are designed in the form of toothed rod, but they can also can have another design that is suitable for transferring a movement to another element. In each case a transmission unit 43 designed as a gear wheel engages in the transmission bar 42 and is attached in each case laterally outside to the fastening housing 46. The transmission unit 43 is coupled in a rotationally fixed manner in each case via a shaft to a signal generator 44. The signal generator 44 is designed as a rotary potentiometer, which is electrically connected to a single processing unit 45 on the back side of the fastening housing 46 and (mechanically) attached on the fastening housing 43.

Figure 2:
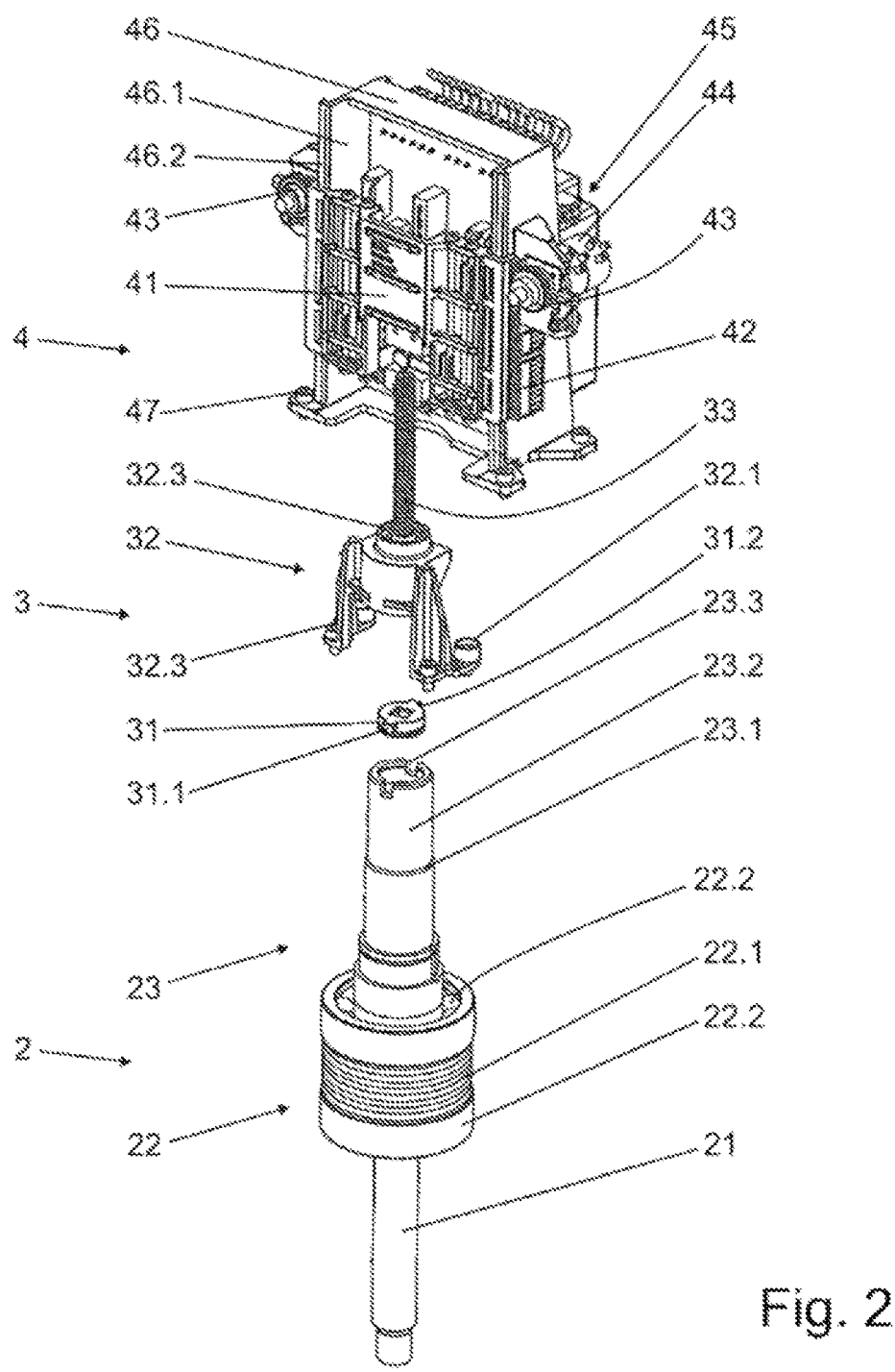
FIG. 2 shows an exploded perspective representation of the sliding unit, adapter unit and measuring unit of the control valve according to FIG. 1.
Figure 3:
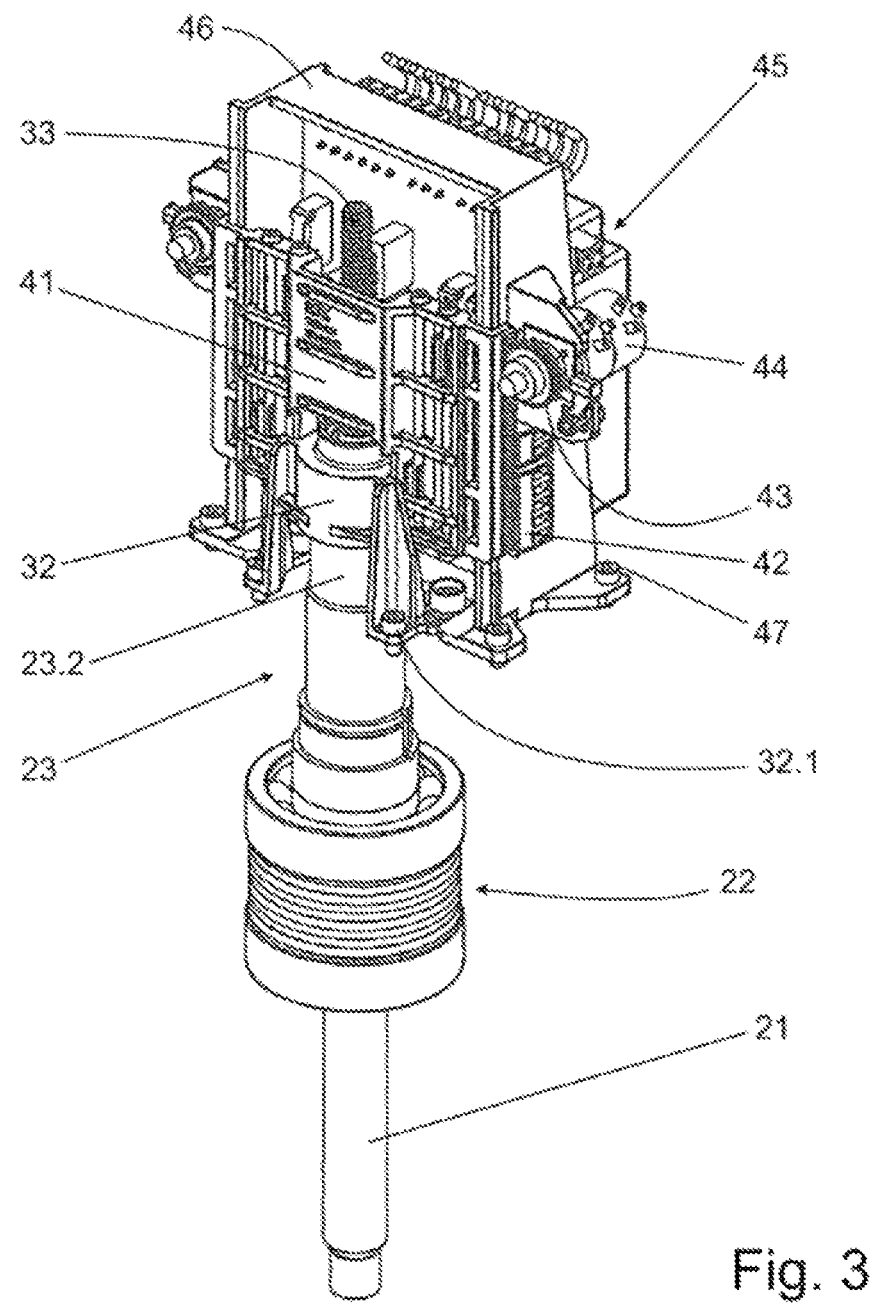
FIG. 3 shows a perspective representation of the assembled units according to FIG. 2.

FIG. 3 shows the components from FIG. 2 in the mounted state. Here, the bearing unit 32 of the adapter unit 3 is slid into the lower area of the fastening housing 46. Both the fastening housing 46 and also the bearing unit 32 can be fixed via a fastening means, here Allen screws 47 or 32.1, in the housing 10 of the control valve 1.

In order to adjust the sliding rod 21 with the valve cone (not represented) by a predetermined adjustment path along the adjustment path direction, the spindle nut 23 is set in rotation via drive and transmission elements (not represented). Due to the rotation of the spindle nut 23, the sliding rod 21 is adjusted vertically in the adjustment stroke direction via the inner thread of the spindle nut 23 in collaboration with the thread of the sliding rod 21. The rotation of the spindle nut 23 is transferred via the coupling element 31 to the adapter shaft 33. The adapter shaft 33 accordingly has the same number of rotations per unit of time as the spindle nut 23. Due to the rotation of the adapter shaft 33, which is mounted so that it cannot move axially, the lifting nut 34 fixed on the measuring carriage 34 is adjusted longitudinally along the adapter shaft 33 in the measurement stroke direction by a measurement path and in the process entrains the measuring carriage 41. The adjustment height, by which the lifting nut 34 is adjusted for each turn, is fixed here via the thread pitch of the adapter shaft 33. Accordingly, the adjustment path of the threaded rod 21 is converted, depending on the thread pitch of the adapter shaft 33, into a certain measurement path. The ratio of adjustment path to measurement path is here established by the ratio "spindle nut 23 or sliding rod 21 thread pitch to the adapter shaft thread pitch."

In this way, different adjustment strokes (of the total possible adjustment path) of control valves can always be converted into a standard measurement stroke (of the total possible measurement path) merely by adapting an exchangeable structural unit, comprising at least one adapter shaft 33 with a corresponding thread pitch and a correspondingly adapted lifting nut 34. It would be conceivable that the exchangeable structural unit contains additional components, for example, the coupling element 31 and the bearing unit 32. However, in the remaining subassemblies, in particular the measuring unit 4 and the cover 10.1, it is advantageous to always use the same elements, which are designed and can be selected precisely for the transfer of a certain measurement stroke and thus a respective measurement path to the signal processing unit 45. In this way, the measuring unit 4 predetermines the desired measurement stroke. This leads to a simple production and installation of control valves 1 and to a simple storage, since relatively few different parts have to be stored even for control valves with different adjustment strokes. The costs are considerably reduced in comparison to conventional designs. Knowing the "adjustment stroke to measurement stroke" ratio or corresponding characteristic parameters, the signal processing unit 45 determines, from the transferred measurement path, the actual adjustment path of the sliding rod 21 and of the valve cone. In a control valve 1 known from the prior art, in the case of different valve strokes, in addition to the lifting member, a large number of other components need to be exchanged as a rule, for example, the cover 10.1, the measuring carriage 41, the transmission unit 43, and the fastening housing 46, wherein, in each case, different adjustments have to be carried out.

Figure 4:
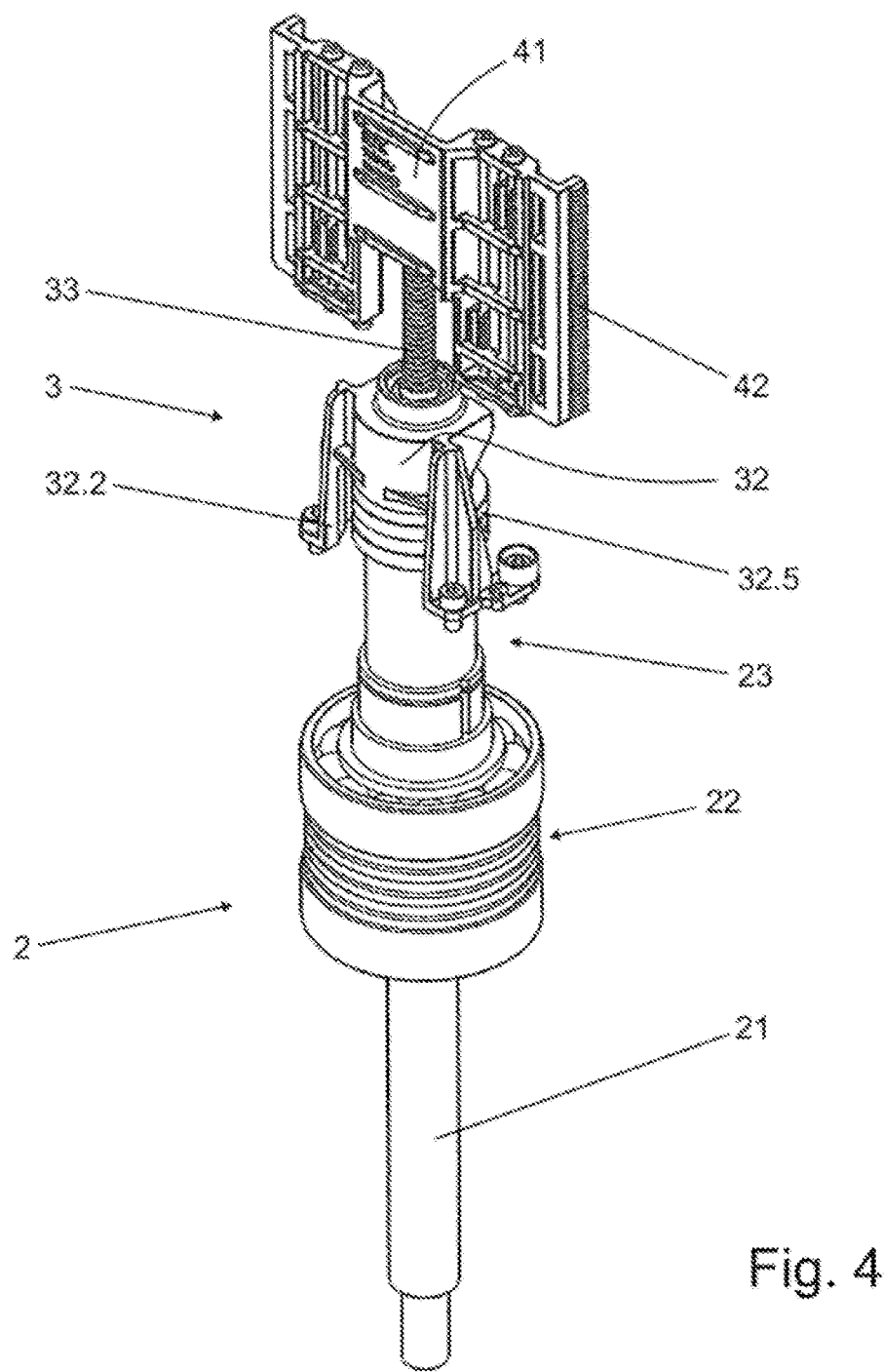
FIG. 4 shows a perspective representation of the sliding unit, adapter unit and a measuring carriage.

In FIG. 4, the sliding unit 2 with the adapter unit 3 and with the measuring carriage 41 of the measuring unit 4 is represented. At the upper end of the spindle nut 23, adjusting rings 32.5 are arranged. When the sliding rod is in a state in which it is moved into a (completely retracted or extended) end position, the spindle nut 23 can move, for example, into the disc spring assembly 22.1 of the spring mount 22, as a result of which the arrival in the respective end position is cushioned. In the process, the spindle nut 23 moves relative to the bearing unit 32, wherein the movement direction of the adjusting rings 32.5 can be detected for the detection of the respective end position.

Figure 5:
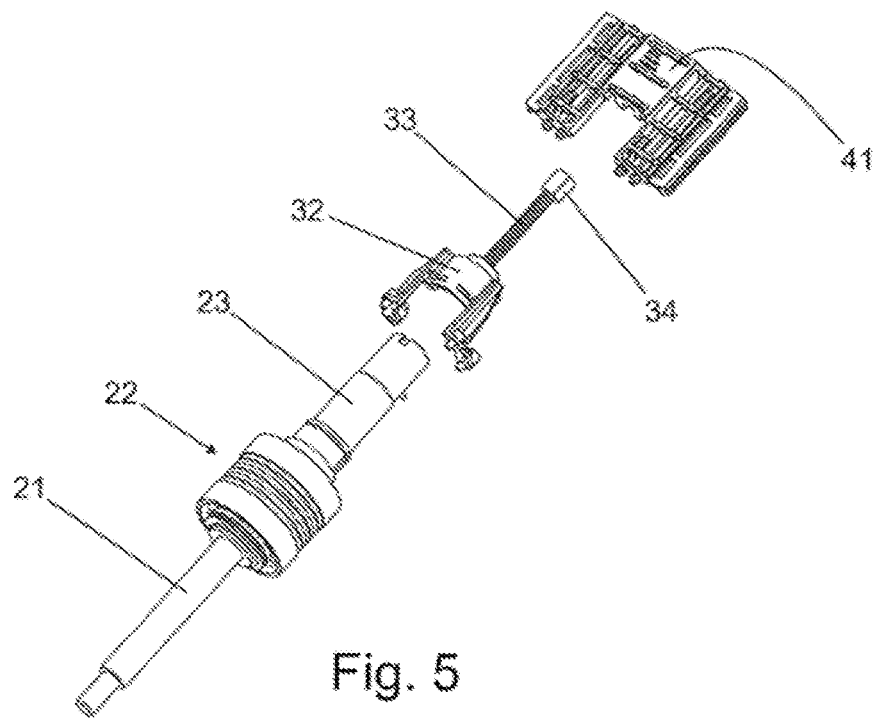
FIG. 5 shows an exploded perspective representation of sliding unit, adapter unit and measuring carriage with lifting nut visible.
Figures 6A, 6B:
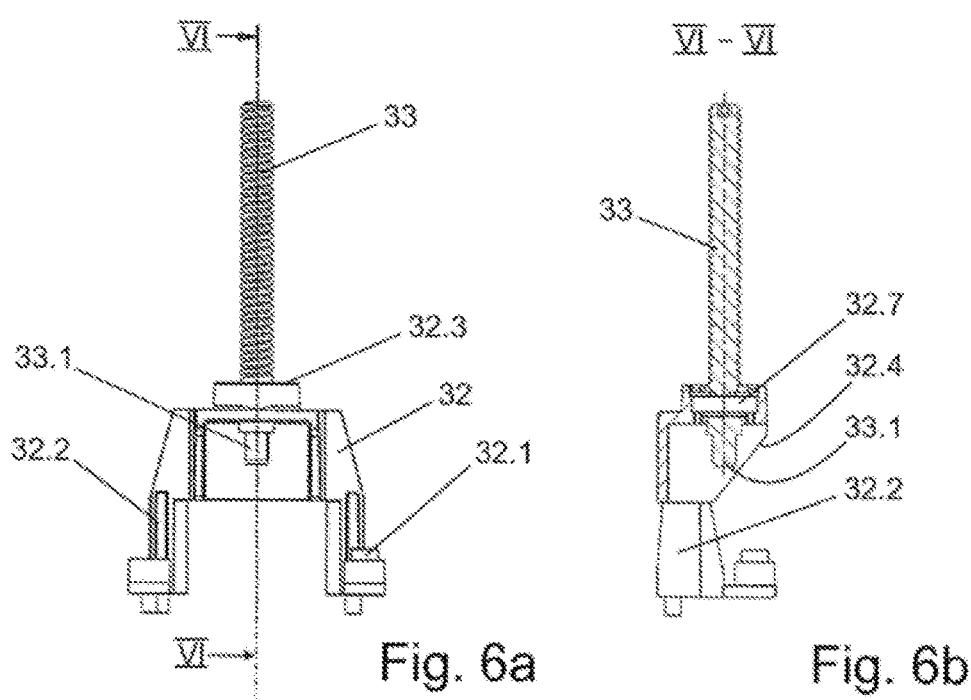
FIG. 6(a)(b) shows an adapter shaft and a bearing unit of an adapter unit according to the invention in a view from behind (a) and in a lateral cross section (b).

FIG. 5 shows an exploded view of the components in FIG. 4, wherein the lifting nut 34 can be seen. It is designed in the form of a four-sided cuboid block. Other forms of the lifting nut are also conceivable, in particular other polygonal forms (three-sided, six-sided, etc.).

FIGS. 6(*a*) and 6(*b*) show the adapter shaft 33 in the bearing unit 32 in a view from behind (FIG. 6(*a*)) and in a lateral view in cross section (6(*b*)). Here, a projection 31.1 at the lower end of the adapter unit 3 can be seen, protruding with positive-lock connection into the coupling element 31 or through said coupling element (not represented). Here, the connection between the projection 31.1 and the coupling element 31 preferably has play in the axial direction, in order to be able to compensate for possible axial movements of the spindle nut 23 (particularly when moving into the spring path of the spring assembly). FIG. 6(*b*) shows the arrangement of a bearing 32.7, by means of which the adapter unit 33 is rotatably secured in such a manner that it cannot be displaced vertically or axially. The bearing 32.7 is preferably designed in the form of a ball bearing, but it can also be formed in another design. In addition, in FIG. 6(*b*), a bevel 32.4 on the back side of the bearing unit 32 can be seen, which allows an optimized arrangement of the bearing unit 32 in the fastening housing 46.

Figure 7A:
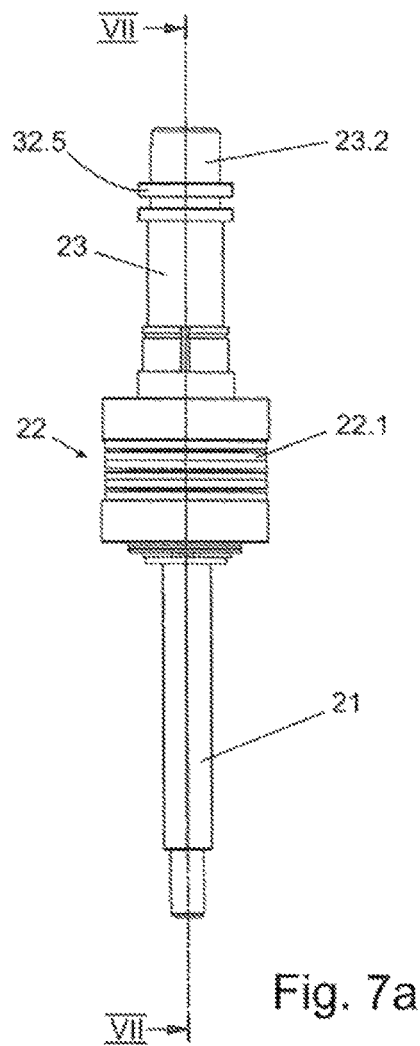
FIG. 7(a)(b) shows a sliding unit in a view from the side (a) and in cross section (b).
Figure 7B:
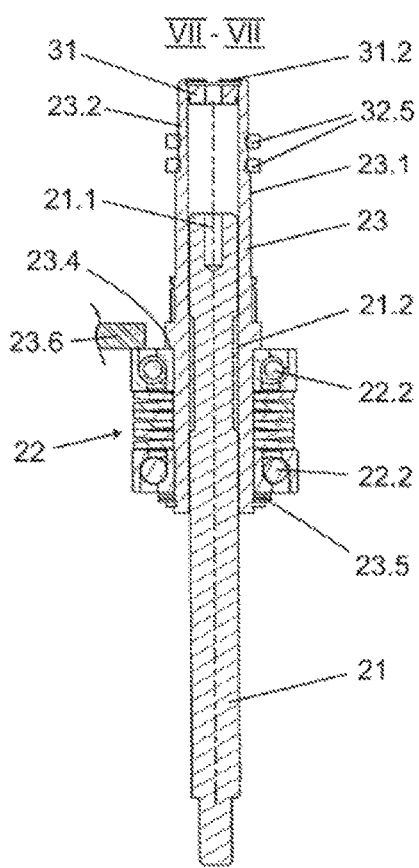

Details of the sliding unit 2 can be seen in FIG. 7(*a*) in a view from the side and in FIG. 7(*b*) in a cross section. On the spindle nut 23, a first and a second support 23.4 and 23.5 can be seen, by means of which the spring mount 22 acts on the spindle nut 23. For example, in the case of complete closure of the control valve, the valve cone moves onto the valve seat, rotates the spindle nut 23 further as a rule briefly, and in the process is pushed upward by the sliding rod 21. In the process, the spindle nut 23 entrains the spring mount 22 via the second support 23.5. On the upper side of the spring mount 22, a counter-bearing 23.6 which is attached in a vertically or axially fixed manner is located, which, for example, is attached to the housing or attached relative to the housing 10. The spring mount 22 is shifted against it and supported on it, so that the disc spring assembly 22.1 located therein is compressed between the second support 23.5 and the counter-bearing 23.6, and the movement is cushioned or damped. Such a damping mechanism can advantageously also be provided for the movement into the completely open state, wherein, for example, the first support 23.4 and a second counter-bearing (not represented) collaborate with the spring mount. In the spring mount 22, the two ball bearings 22.2 for the rotatable mounting of the spindle nut 23 can be seen. FIG. 7(*b*) shows the thread of the sliding rod 21. In addition, a recess 21.1 can be seen on the upper end face of the sliding rod 21, which can accommodate the coupling end 33.1 of the adapter shaft 33.

In the embodiment examples described, the adapter unit 3 is provided with a transmission unit designed as an adapter shaft 33. The conversion of the adjustment stroke into the measurement stroke occurs at constant transferred rotation speed via the thread pitch of the adapter shaft. Other design variants are also conceivable in which, for example, a transmission-type arrangement is used with one or more gear wheels and/or toothed rods and/or toothed belts in the adapter unit. These can also achieve, for example, a different measurement stroke by variation of the rotation speed. The assignment of the elements, as they occur, to the adapter unit 3 or the measuring unit 4 can vary depending on the function thereof.

By the use according to the invention of an adapter unit 3 between the sliding unit 2 and the measuring unit 4, it is thus possible, in particular in valve construction series with different adjustment strokes, by conversion to a standard measurement stroke, to considerably reduce the expense for parts and production in a simple manner, which is connected with a considerable cost reduction.

While the invention has been described with reference to one or more embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In addition, all numerical values identified in the detailed description shall be interpreted as though the precise and approximate values are both expressly identified.

The invention claimed is:

1. A control valve (1) with a valve housing (13) through which a flow channel (14) runs with a flow cross section that can be changed via a specified adjustment stroke by means of a closure unit consisting of a valve seat and a valve cone which can be adjusted relative to the valve seat, and with an adjusting device which has a sliding unit (2) with a sliding rod (21) that adjusts the valve cone over an adjustment path and a drive device that acts on the sliding rod and is controlled by a controller, wherein the controller has a measuring unit (4) which detects the adjustment path via a transmission unit;
wherein the transmission unit is provided with an adapter unit (3) comprising a replaceable structural unit, between the sliding unit (2) and the measuring unit (4), said adapter unit converting the adjustment stroke into a measurement stroke specified by the measuring unit (4) in a manner corresponding to a transmission ratio specified by the adapter unit;
wherein the measuring unit (4) has a displaceably mounted lifting element and that the structural unit comprises the transmission unit which is coupled to the lifting element;
wherein the lifting element travels a measurement path proportional to the adjustment path in a manner corresponding to a transmission ratio, that the lifting element converts the measurement path of at least one transmission bar (42) arranged on the lifting element to the transmission unit (43) which is in operative connection with a signal generator (44) delivering position signals, and that the measuring unit (4) is designed for determining the adjustment stroke from position signals of the signal generator (44).

2. The control valve (1) according to claim 1, wherein the structural unit comprises a lifting member, by means of which the transmission unit is coupled to the lifting element.

3. The control valve (1) according to claim 2, wherein the transmission unit is an axially non-displaceable rotatably mounted adapter shaft (33) which is coupled to the lifting element via a lifting member that is axially moved on said adapter shaft during the turning, and that the lifting member is a lifting nut (34).

4. The control valve (1) according to claim 2, wherein the lifting member is fixed with friction lock to the lifting element.

5. The control valve (1) according to claim 1, wherein the lifting element is designed as a displaceably mounted measuring carriage (41).

6. The control valve (1) according to claim 1, wherein the adapter unit (3), for the coupling to the sliding unit (2), has a coupling element (31), and, for the connection to a housing (10) of the control valve (1), has a bearing unit (32), and that the sliding unit (2) is provided with a coupling connection complementary to the coupling element (31).

7. The control valve (1) according to claim 6, wherein the coupling element (31) is part of the exchangeable structural unit, and that the bearing unit (32) with the structural unit is connected exchangeably or permanently to the valve housing (13).

8. The control valve (1) according to claim 1, wherein the adjustment stroke is between 1 and 100 mm, and that the measurement stroke is between 1 and 80 mm, wherein the measurement stroke is smaller than or equal to the adjustment stroke.

9. The control valve (1) according to any one of claim 6, wherein the transmission unit (33) with the end thereof facing the valve seat protrudes into the bearing unit (32) connected fixed in place to the housing (10) and is fixed in the bearing unit (32) in a manner so that it cannot be moved in the measurement stroke direction.

10. The control valve (1) according to claim 9, wherein the transmission unit (33) is rotatably mounted about the measurement stroke axis in the bearing unit (32).

11. The control valve (1) according to claim 1, wherein the sliding unit (2) comprises a spindle nut (23) which extends longitudinally concentrically with respect to the adjustment stroke axis and which can be set in rotation about the adjustment stroke axis depending on the drive direction, and that the sliding rod (21) is a threaded rod guided in the spindle nut (23), wherein it is mounted in such a manner that it is adjusted in the adjustment stroke direction when the spindle nut (23) is rotated.

12. The control valve (1) according to claim 11, wherein the spindle nut (23) with the end thereof facing away from the valve seat protrudes on the opposite side of the transmission unit (33) into the bearing unit (32), that the coupling element (31) is arranged between the spindle nut (23) and transmission unit in the bearing unit (32), and that the coupling is designed in such a manner that the rotation of the spindle nut (23) is transferred via the coupling element (31) to the transmission unit.

13. The control valve (1) according to claim 12, wherein the rotation of the transmission unit adjusts the lifting element in the measurement stroke direction by means of the lifting member which is fixed with friction lock to the lifting element.

14. The control valve (1) according to claim 10, wherein the spindle nut (23) on the side thereof facing the valve seat is resiliently braced by a spring mount (22) relative to the valve seat, and/or that the spindle nut (23) is resiliently braced in the bearing unit (32).

15. The control valve (1) according to claim 14, wherein in the completely extended state of the sliding rod (21), the spindle nut (23) can be moved into the spring path of the spring mount (22).

16. The control valve (1) according to claim 11, wherein in the completely retracted state of the sliding rod (21), the spindle nut (23) can be moved into the spring path of the spindle nut (23) or into the bearing unit (32).

17. The control valve (1) according to claim 14, wherein the spring mount (22) comprises disc springs for the resilient bracing of the spindle nut (23).

* * * * *